(12) United States Patent
Woelcken et al.

(10) Patent No.: US 8,302,448 B2
(45) Date of Patent: Nov. 6, 2012

(54) EXPANSION TOOL AND METHOD FOR COLD EXPANSION OF HOLES

(75) Inventors: Piet Woelcken, Bremen (DE); Eggert D. Reese, Oberpframmem (DE); Timothy G. B. Jones, Aurade. Gers (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/209,117

(22) Filed: Aug. 12, 2011

(65) Prior Publication Data

US 2012/0000266 A1 Jan. 5, 2012

Related U.S. Application Data

(63) Continuation of application No. 11/915,960, filed as application No. PCT/EP2007/003464 on Apr. 20, 2007.

(30) Foreign Application Priority Data

Apr. 24, 2006 (DE) .......................... 10 2006 019 405

(51) Int. Cl.
*B21D 39/20* (2006.01)
(52) U.S. Cl. ................... 72/370.05; 72/353.4; 72/391.4; 72/393; 29/523
(58) Field of Classification Search .................. 72/353.4, 72/370.05, 391.4, 393, 451, 453, 453.19, 72/477, 479; 29/523
See application file for complete search history.

(56) References Cited

U.S. PATENT DOCUMENTS 808,030 A 12/1905 Faessler
(Continued)

FOREIGN PATENT DOCUMENTS

DE 26 54 102 6/1978
(Continued)

OTHER PUBLICATIONS

Russian Office Action issued May 1, 2011, in Patent Application No. 2008146051/02 (with English-language translation).

(Continued)

*Primary Examiner* — David B Jones
(74) *Attorney, Agent, or Firm* — Oblon, Spivak, McClelland, Maier & Neustadt, L.L.P.

(57) ABSTRACT

A method for cold expansion of a hole formed in a work piece. The method comprises providing a body comprising at least a cylindrically shaped part having an inner hole in axial direction of the body. The body further comprises along its circumferential direction a plurality of members which are movable in radial direction of the body, such that the outer diameter of the cylindrical part of the body can be changed. The method comprises introducing the body into the hole formed in the work piece; inserting a core into the inner hole of the cylindrically shaped part, wherein at least one of the core or the inner hole comprises a portion having changing diameter and the inner hole and the core get into contact with respect to each other upon insertion of the core, such that in dependency of the insertion depth of the core into the inner hole in axial direction the members move in radial direction outwardly and the outer diameter of the cylindrical part of the body increases and, accordingly, acts on the inner circumference of the hole formed in the work piece so that a boundary zone of the hole is compressed, which leads to a compression or hardening and, accordingly, to the introduction of compressive stress in the boundary zone. The inner hole and the core have a polygonal cross section in a direction perpendicular to the longitudinal axis, and the hole formed in the work piece is expanded over the entire thickness of the work piece in which the hole is formed.

12 Claims, 4 Drawing Sheets

U.S. PATENT DOCUMENTS

| | | | |
|---|---|---|---|
| 2,672,175 | A | 3/1954 | Russell |
| 2,943,667 | A | 7/1960 | Ewing et al. |
| 3,060,994 | A | 10/1962 | Larsen et al. |
| 3,324,701 | A | 6/1967 | Shultz |
| 3,677,684 | A | 7/1972 | Platz |
| 3,892,121 | A | 7/1975 | Champoux et al. |
| 3,986,383 | A | 10/1976 | Petteys |
| 4,034,591 | A | 7/1977 | Rothenberger |
| 4,735,078 | A | 4/1988 | Wesebaum |
| 4,753,101 | A | 6/1988 | Shultz |
| 4,987,763 | A | 1/1991 | Kistner et al. |
| 5,138,863 | A | 8/1992 | Kistner et al. |
| 7,926,319 | B2 | 4/2011 | Johnson |

FOREIGN PATENT DOCUMENTS

| | | |
|---|---|---|
| DE | 92 10 143 U1 | 11/1992 |
| EP | 0 131 648 | 1/1985 |
| EP | 0 581 385 | 5/1997 |
| EP | 1 611 976 | 1/2006 |
| JP | 9-85533 | 3/1997 |
| SU | 822953 | 4/1981 |

OTHER PUBLICATIONS

Chinese Office Action issued Jan. 5, 2012, in Chinese Patent Application No. 200780014859.6 submitting English translation only.

Examination Report issued Apr. 4, 2012, in European Patent Application No. 07724401.0.

Extended Search Report issued May 2, 2012, in European Patent Application No. 11176749.7.

Office Action issued May 10, 2012, in Canadian Patent Application No. 2,649,560, filed Apr. 20, 2007.

Office Action issued Jul. 26, 2012, in Chinese Patent Application No. 200780014859.6, filed Apr. 20, 2007 (with English language translation).

EXPANSION TOOL AND METHOD FOR COLD EXPANSION OF HOLES

This application is a continuation application of U.S. application Ser. No. 11/915,960, filed Dec. 23, 2008, which is the national stage of PCT/EP2007/003464, filed Apr. 20, 2007, and claims priority under 35 U.S.C. 119 to German Patent Application No. 10 2006 019 405.5, filed Apr. 24, 2006. The entire content of U.S. application Ser. No. 11/915,960, is incorporated herein by reference.

The invention refers to a tool for cold expansion of holes in metallic work pieces, in particular of holes having essentially circular cross section, in plate shaped structural parts.

For example in aircrafts, construction holes are formed in, for example, plate shaped structural parts made of metallic materials, which are used inter alia for inserting and fixing mounting devices. It is known that ruptures of cracks can occur at the circumference of such holes, under permanent or cyclic loads of the structure, in particular under alternating loads, and that these cracks can propagate and lead to a failure of the structure to a larger extent, if they are not recognized and repaired in time.

For avoiding this it is known to plastically deform the surroundings of the metallic work piece immediately adjacent to the hole by means of cold work hardening after boring the hole, such that a zone of compressive residual stresses or self equilibrating stresses is formed around the hole, which prevents that cracks occur under cyclic loads or which renders the generation of cracks less likely, because of a higher strength and overlapped tension fields. Accordingly, the fatigue life time of the holes in metallic structures is enhanced.

The compressive stresses in the boundary zone of the hole are formed by expanding the hole by means of cold work expansion. This is usually done by using a conical core (mandrel) which is pulled through the hole into which previously a sleeve is inserted. When the assembly of the core and the sleeve is pulled through the hole or the core is pulled through the sleeve introduced into the hole, for which usually a hydraulic pulling machine is used, the material around the hole is plastically deformed due to the fact that the diameter of the core together with the sleeve is larger than the original diameter of the hole. In particular, the hole is expanded, such that the core can pass through the hole. However, for e.g. high performance aluminium materials a corresponding method can lead to the formation of cracks at the edge of the bore and to an irregular strain field around the bore.

From U.S. Pat. No. 3,892,121 a device is known, in which a conical core and a sleeve are firstly passed through the hole and subsequently the core is passed through the sleeve in opposite direction, wherein a portion of larger diameter of the core deforms the sleeve and accordingly the hole.

A corresponding device is also known from EP 0 131 648 A2.

For facilitating removal of the sleeve from the hole after working, EP 0 581 385 B1 uses a split sleeve, which can be compressed after passing the core and can accordingly be removed from the bore.

After passing the core through the sleeve and the hole and after removal of the sleeve the hole is reamed, wherein, however compressive residual stresses remain exceeding those in the boundary region.

With the known devices for cold expansion of holes the deformation of a work piece is determined by means of the combination of the size of the sleeve and the core. This means that the deformation of the work piece around the hole is also determined by the expansion (compression), i.e. the geometrical dimensions of sleeve and core.

Starting therefrom it is an object of the invention to provide a tool for cold expansion of holes, which ensures a high reproducibility and which allows a deformation of the work piece in the surroundings of the holes based on control of stress.

This object is solved by means of a tool having the features of claim 1. Preferred embodiments are defined by the dependent claims.

The invention is based on the idea that a part of a tool which is to be introduced into a hole to be worked, is formed by means of a plurality of members, such that this part is radially expandable. For example a cylindrical part of the tool having circular outer cross section, which is shaped as a thick-walled ring, can be split in cake-like manner, i.e. in radial direction, into a plurality of ring sectors, having for example identical central angles. By introducing a further member of the tool (core) into an inner hole in the tool the plurality of members of the body to be introduced into the hole are shifted radially outwards and, accordingly, act on the inner circumference of the hole to be worked on.

Because the increase of diameter of the part of the tool performing the cold deformation work can be controlled, by having at least one of core or the inner member a portion of changing diameter, such that by adjusting the insertion depth of the core into the inner hole the amount of radial outward movement of the parts of the cylindrically shaped part of the tool for cold expansion of holes can be controlled, it is possible, to control the deformation by means of the force applied, expressed as an increase of outer diameter of the cylindrically shaped part of the tool. Furthermore, dependent on the actual original hole size and the desired stress to be introduced into the boundary zone of the hole, the amount of the deformation can be controlled variably using one single tool by means of the tool according to the invention. Furthermore, the deformation force is applied in radial direction of the whole, without application of a tension force in axial direction of the hole at the same time, because no core or a similar member is pulled through the hole.

Preferably, a means is provided at the tool which allows to monitor or control the insertion depth of the core into the inner hole. Preferably, the means can be formed by a male screw at the core and a female screw at a device which determines the relative position of the core and the body in its original position in axial direction. By rotating the core by means of the screw device a specified rotational angle, accordingly, the introduction depth of the core into the inner hole is exactly determined in relation to the known screw pitch and can be easily checked and monitored, for example using a label at the core. As the introduction depth of the core determines the change of diameter of the cylindrical part of the tool, the stress introduced into the surroundings of the hole can be exactly determined, when the initial position between the core and the cylindrically shaped body portion being formed of several members is known. Of course, the positioning of the core can also be carried out in a different manner (for example using means controlled by force, hydraulic or pneumatic means, if necessary additionally using a stopper, or by using a separate setscrew).

According to a particularly preferred embodiment the inner hole and/or the core are formed with conically tapering surfaces, especially complementary surfaces, such that the movement of the core into the inner hole allows to finely adjust the amount of deformation.

According to a further preferred embodiment an elastic means is provided which biases the members of the body carrying out the radially outward movement into a position, in which they assume a minimal diameter. For example the means can be formed by an elastic cap or ring member, which is provided over or around the sliding portions, for example within a circumferential groove. Alternatively it is for example possible to form a part of the cylindrical portion of the body to be introduced into the hole to be expanded and connecting in axial direction to the radially movable members of the body such that the split parts are elastically connected therewith and can move outwardly or bend outwardly.

The cylindrical part of the body, which is formed by a plurality of members, preferably has a cylindrical shape on its outside having circular cross section according to the circular cross section of the holes to be worked. This allows a smooth introduction of residual compressive stress into the portion surrounding the holes without relevant local residual tensile stress concentrations.

According to a preferred embodiment the plurality of members of the cylindrical shaped part are formed such that their side faces run through the longitudinal axis of the cylindrical part. The single members of the cylindrically shaped part are preferably shaped identically, especially comprise identical central angles, which means that the tool forms a closed cylindrical surface when the plurality of members of the cylindrically shaped part are in the position having minimal diameter. This has the advantage that the construction of the tool is comparatively easy.

According to an alternative embodiment the cylindrical part is formed by members having different shape, further preferably by a plurality of members having two or a plurality of shapes in total. These plurality of members having different shape preferably form in their position of maximal diameter, i.e. the position of the intended final diameter, a closed outer cylindrical surface, which means that a slit free expansion of a hole having a particular initial hole size to be worked with a particular expansion ratio is possible and local stress concentration due to non uniform influence of the tool on the circumference of the hole can be avoided when cold expanding the hole. The different members preferably comprises side faces which do not extend through the longitudinal axis of the cylinder of the cylindrically shaped part of the tool, such that preferably a member which is positioned between two adjacent members, moves faster inwardly than the adjacent members, when the core is retracted from the inner hole, such that the tool which does not have any discontinuities in the expanded condition can be compressed to smaller outer dimensions.

According to a preferred embodiment the core and the inner hole of the body have a polygonal cross section. Particularly, it is preferred that they have complementary pyramidal shapes with square cross section in a direction perpendicular to a longitudinal axis or the insertion direction. This specific shape of the cone supports a uniform introduction of the force into the work piece and, accordingly, leads to a clearly enhanced flowability of the material. When the linear motion of the core in axial direction is controlled, a homogeneous strength field is obtained, which is a prerequisite for an effective increase of the fatigue resistance. This, furthermore, allows to expand holes formed in high performance materials without formation of cracks. In particular, especially if the flowability of the material is related to the members of the body such that anisotropic properties of the material are considered (for example caused by the rolling direction of plate shaped materials), a smooth expansion of the bore along the entire thickness of the plate is possible.

The invention can also be applied to hybrid-composite materials/hybrid-composite stacks, for example Aluminium/carbon fibre reinforced plastics (Al/CFRP), wherein for example the Al-component can be expanded independent of the CFRP-part, without being in contact with this part. It is not necessary to unmount the parts for expanding the Al-component. Furthermore, friction at the surfaces or walls of the bore or the hole can be avoided, such that an additional working after the expansion is not necessary.

Subsequently the invention is described in detail based on the attached figures, in which.

Figure 1:
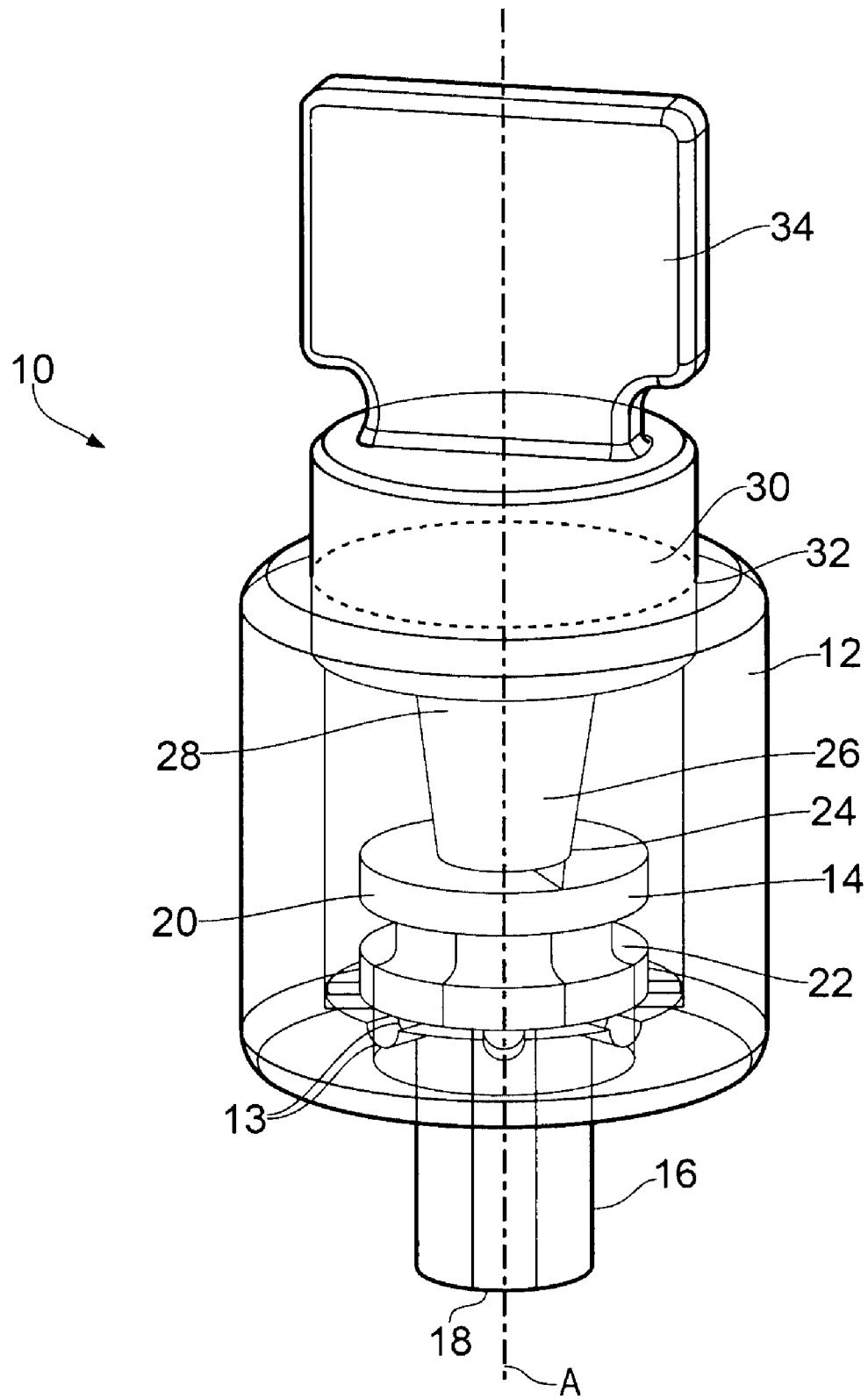
FIG. 1 shows a perspective view of a first embodiment of the tool for cold expansion of holes.

FIG. 1 shows in a perspective view a tool 10 for cold expansion of holes, especially in metallic materials. The tool 10 comprises a tool cap 12 which supports a body 14 and guides the body 14. The body 14 comprises a part 16 which has outer cylindrical shape and which can be introduced into a hole (not shown) which is to be expanded by cold expansion, wherein in the position shown in FIG. 1, in which the cylindrical part 16 of the body 14 has minimal diameter, the hole to be expanded has preferably a diameter, which is slightly larger than the outer diameter of the cylindrical part 16. Preferably, the outer diameter of the cylindrical part 16 is determined such that it can be inserted into the hole or bore without encountering frictional resistance.

The body 14, including the cylindrical part 16 thereof, is formed of a plurality of identical, thick-walled members 18 (ring segments) (eight in the embodiment shown), which divide the body 14 and especially the cylindrically shaped part 16 in a cake-like manner. The boundary faces to an adjacent member 18 of the body 14 run in radial direction, respectively, i.e. their virtually extended planes through the cylinder longitudinal axis A of the body 14. The central angles of the members 18 are identical with respect to each other in the embodiment shown, especially 45°, respectively.

In the tool cap 12 also an essentially cylindrical part 20 of the body 14 is provided which has a larger outer diameter than the cylindrical part 16 and which comprises a groove 22, into which, for example, a rubber ring can be inserted (not shown) for holding the members 18 forming the body 14 in their position of minimal diameter and for biasing them into this position.

The members 18 are slidable in radial direction of the body 14, such that they can be moved from the position shown in FIG. 1 radially outwardly against the biasing force of, for example, the rubber ring, such that the cylindrically shaped part 16 of the body 14 defines a larger outer diameter than its initial outer diameter and than the initial inner diameter of the hole to be expanded, wherein small gaps are formed between two adjacent members 18, respectively. The radial movement direction is ensured by means of suitable guides 13.

The body 14 is further provided with a suitable inner hole 24 (here a conical inner hole, i.e. in each cross section perpendicular to longitudinal axis circular), into which a core 26 can be inserted, which is in its part 28, which is insertable into the inner hole 24, conical or truncated having circular cross sections perpendicular to its longitudinal axis. The inner hole 24 is preferably also conical, complementary to the cone of the core 26, such that the core 26 and the inner hole narrow down in the position shown in FIG. 1 from top to the bottom.

The core 26 further comprises a portion 30 having a male thread, which stands against a female thread 33 formed at the tool cap 12. Further, the core 26 is provided with a butterfly nut shaped holding surface 34 at its upper end, which on the one hand determines the rotational position of the core 26 around the axis A and allows monitoring thereof, and on the other hand provides a working surface for a rotating tool or a similar means.

The cap 12 furthermore serves for positioning the body 14 and the core 26 in their initial position with respect to the axial direction of the axis A with respect to each other, by providing for example suitable stopper surfaces in axial direction for the portion larger diameter.

By turning at the holding surface 34 of the core 26 this is moved relatively to the body 14 a distance determined by the threads 30, 32 in dependency of the rotational angle, in axial direction of the axis A into the body 14. The distance is defined by means of the rotational angle and the thread pitch. The conical faces 24, 28 of the body 14 and the core 26, respectively, cause on evasion of the members 18 of the body 14 in radial direction upon insertion of the core 26 into the inner hole 24 of the body 14, including the cylindrically shaped part 16 of the body 14. Thereby a force is applied in radial direction on the inner hole to be worked, into which the body 14, in particular the cylindrical part 16 thereof, is introduced, and the boundary zone of the hole is compressed, which leads to a compression or hardening and, accordingly, to the introduction of compressive stress. The amount of the expansion of the body 14 and, accordingly, the hardening or compression of the boundary zone of the hole and the expansion of the hole to be worked, can be determined by the insertion depth of the core 26 into the inner hole 24, wherein by means of the positioning aid by the threads 32, 30 an exact positioning and, accordingly, a cold expansion in an exactly predetermined amount or with defined force become possible. The final shape or the final diameter of the hole or bore to be expanded can be selected variably within the diameters which can be achieved by means of a single tool.

After performing the cold expansion, the core 26 is removed from the inner hole 24 of the body 14 by means of a screw motion in opposite direction to the screw motion for insertion, wherein the elastic member in the groove 22 forces the members 18 of the body 14 to move radially inward. Accordingly, the body 14 can be removed from the expanded hole without any problems.

Due to the well definable, reproducible and flexibly determinable target diameter of the cylindrical part 16 of the body 14 it is possible to determine the expansion carried out in the hole iteratively, i.e. to adjust it. Furthermore, holes having an initial hole diameter within a small, determined range can be expanded to an arbitrarily new hole diameter within the possible range for expansion of the tool 10 by means of one single tool. The force with which the segments of the cold working tool 10 are pushed outwardly is directly proportional to the rotational moment or the pressure which is applied within the tool 10 by means of rotation or shift of the core 26 relative to the body 14, as well as to the geometry of the hole and the material properties, wherein an expansion of the hole to be expanded determined by means of force becomes possible. After completion of the cold working the tool can be easily removed.

Figure 2:
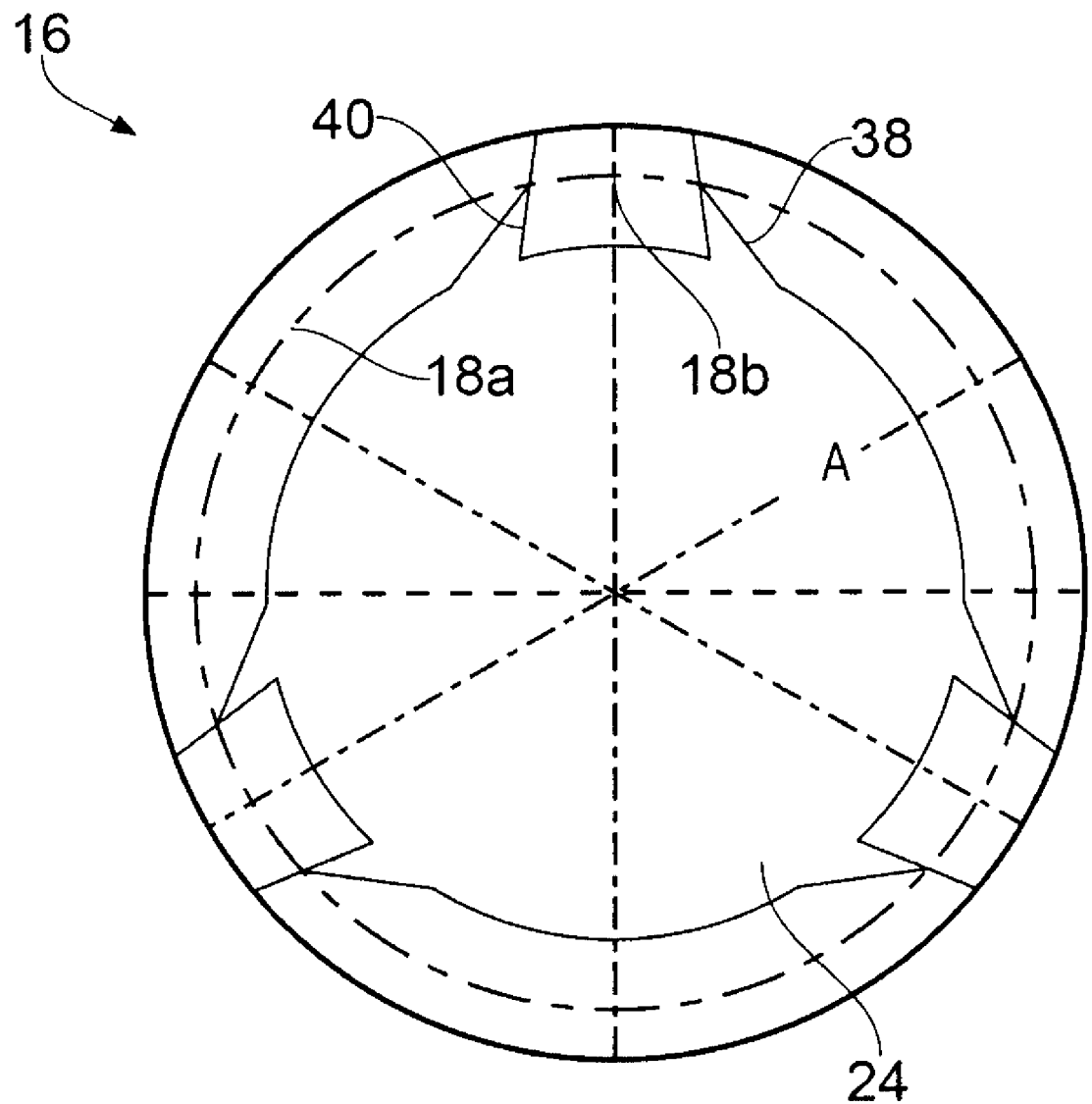
FIG. 2 shows a cross sectional view through a cylindrically shaped part of a tool for cold expansion of holes in a second embodiment.

For achieving a split free expansion, the tool 10 shown in FIG. 1 can be modified according to the sectional view of FIG. 2. Thus, only the body 14 and the members 18 constituting the body 14 are modified such that the body 14 is not formed by cake-like partition of a simple cylindrical ring body in identical parts but, to the contrary, by specific adaption of the respective parts regarding their shape.

FIG. 2 shows in cross section a corresponding view through the cylindrical portion 16 of the body 14 of the tool 10. As the outer diameter of the cylindrically shaped part 16 of the body 10 is determined such the members 18a, 18b forming the body 14 from a closed circumferential surface at a target outer diameter, which corresponds to the expanded diameter of the hole to be worked, stress concentrations, as they result in contact portions in view of non contact portions with the tool in the embodiment according to FIG. 1, can be avoided.

According to FIG. 2, therefore, the tool is formed from non-identical members 18a and 18b, of which in the embodiment shown three, respectively, are alternatingly provided along the circumference. The members 18a, 18b differ from the members 18 of embodiment 1 by differently aligned contact surfaces to the adjacent members 18b. While according to the embodiment in FIG. 1 the respective contact surfaces cross in their virtually extended plane the axis A of the cylinder, the intersection line is under an angle to this plane along the boundary surface 38. Between the members 18a further members 18b are provided which have side surfaces which also do not pass through the axis A but which are directly slightly outwardly with respect to a radial direction, along the boundary surfaces 40.

FIG. 2 shows the most expanded position of the body 14. If the outer diameter is to be reduced for removing the tool, for example to the outer circumference shown by dotted lines in FIG. 2, the core 26 having the conical surface 28 (see FIG. 1) has to be lifted and removed from the inner hole 24. A force which is applied by for example locally thickened rubber members around the groove 22 in portions of the members 18b (see FIG. 1) firstly moves the members 18b in direction radially inwardly. Subsequently the members 18a can be moved in radial direction inwardly, i.e. approaching each other, by means of a force which is for example applied by thinner portions of the ring shaped rubber member in the groove 22 in FIG. 1, such that the outer diameter is reduced in general. In the reduced condition of the outer diameter the embodiment according to FIG. 2 does not have a closed outer circumferential surface in the cylindrical part 16 of the body 14.

Figure 3:
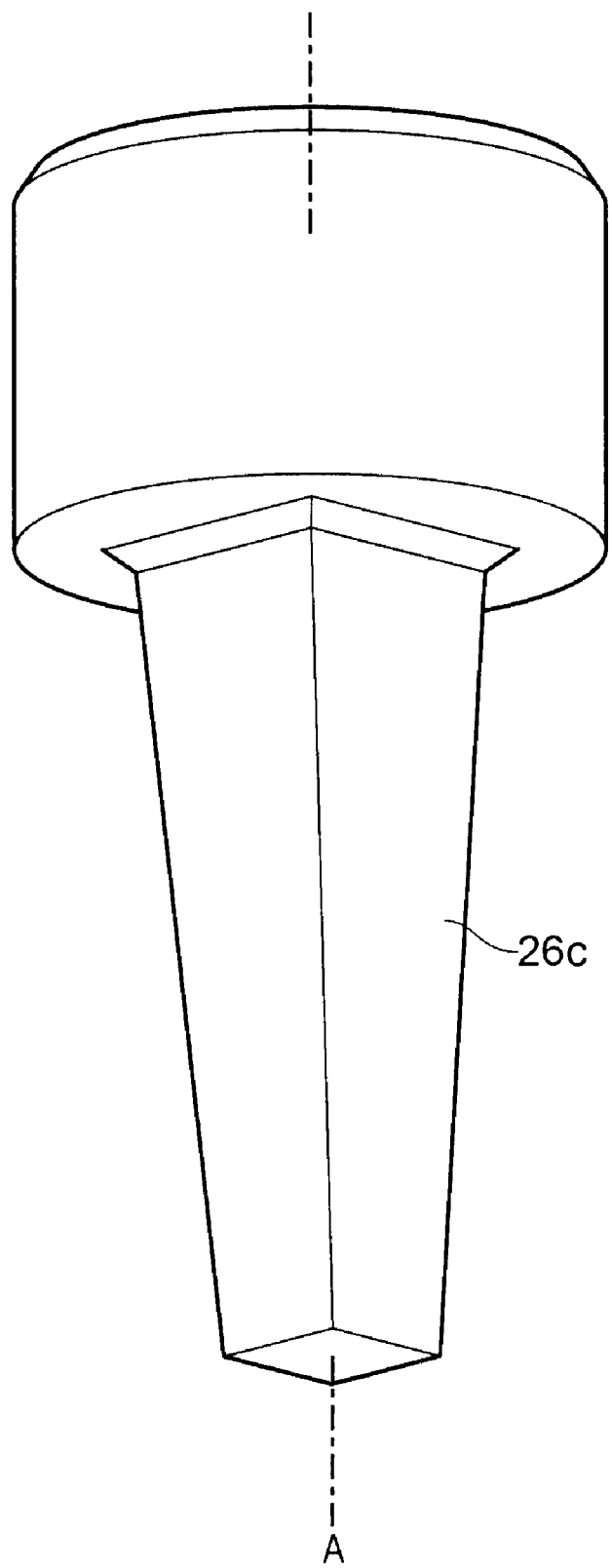
FIG. 3 shows a perspective view of a core in a third embodiment.
Figure 4:
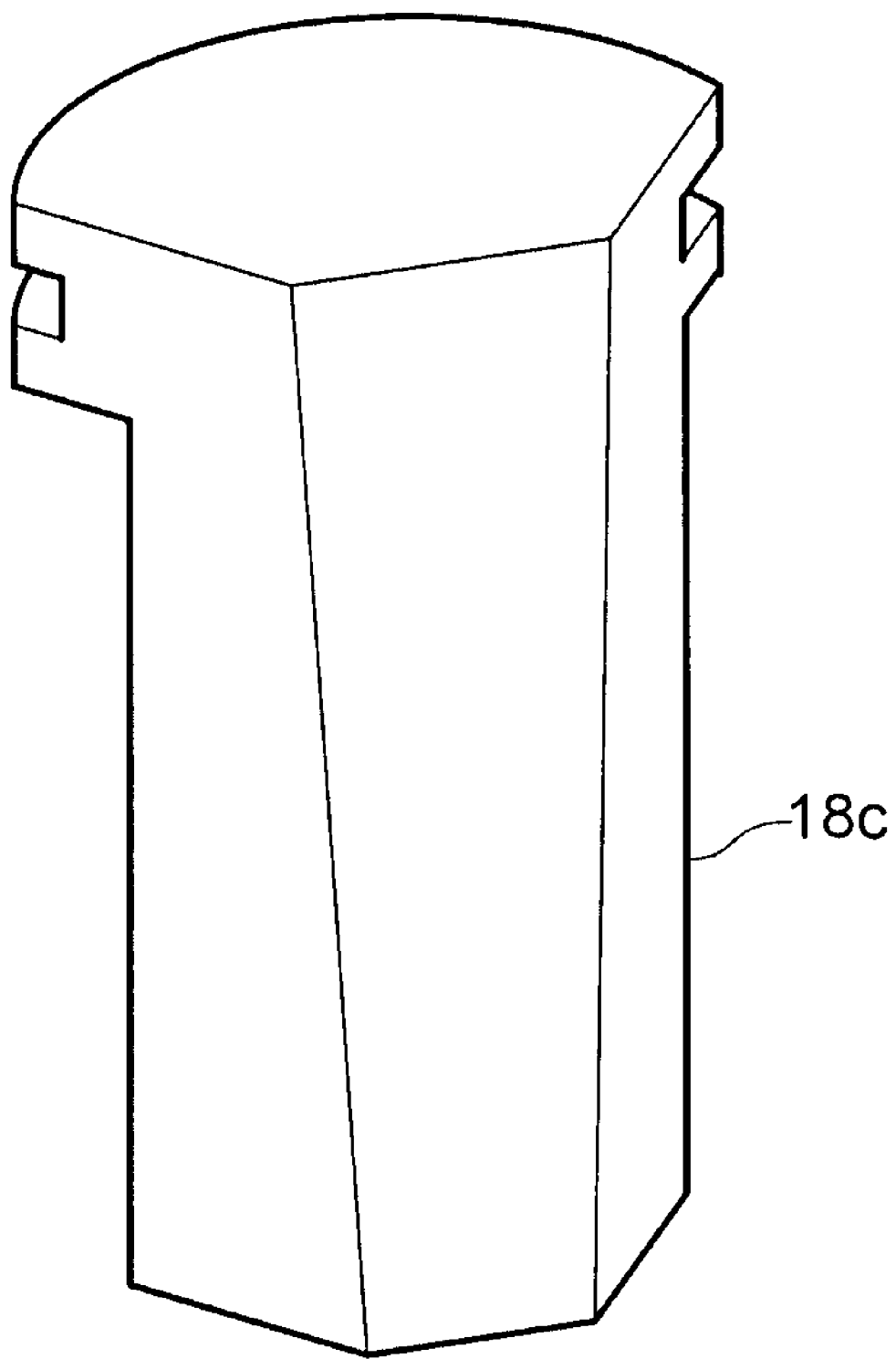
FIG. 4 shows a perspective view of a part of the body of the third embodiment.

FIG. 3 and FIG. 4 show a further embodiment of the parts 18c forming the body 14 and the core 26c. In contrast to the previous embodiments the core 26c is introduced into the inner hole 24 of the body 14 by means of pure translative movement, without rotation. The core 26c has in its portion to be inserted into the inner hole 24 a polygonal cross section in a cutting direction perpendicular to its longitudinal axis or to its direction of insertion, in particular a square shape, wherein it is tapering in insertion direction, such that in total a truncated pyramidal shape results. Correspondingly, the body 14 is shaped of four evenly distributed quarters, wherein the inner hole 24 formed by these quarters corresponds to the shape of the core 26, such that each member 18c has an even, planar surface forming the inner hole 24 when assembled. In particular, it is preferred that the body 14 is shaped of a number of members 18c corresponding to the number of sides or corners of the polygon forming the core 26c.

In particular, a square cross section of the core 26c and the inner hole 24 of the body 14 shows that an even, uniform force distribution results when inserting the core 26c into the inner hole 24. This internally leads to a uniform expansion of the core or hole over the entire thickness of the plate in which the hole is formed. Furthermore, when using core 26c having a square cross section, it is preferred that the flowability of the material forming the work piece is taken into account when positioning the expansion tool, especially such that anisotropy of a work piece, for example the rolling direction of plate materials, is taken into account. Accordingly, an even and smooth distribution of the residual stresses around the entire circumference of the hole can be ensured.

Similar to the previous embodiments no axial forces are transferred to the work piece, such that bending can be avoided. Furthermore, friction on the walls of the hole can also be avoided, such that it is not necessary to provide a subsequent working step after the cold expansion. As the tool is comparatively simple it can be easily inserted also into inner bores, which are usually not easily reachable. This, in turn leads to reduced production costs.

If the expansion tool according to FIGS. 3 and 4 is used, the means for monitoring the insertion depth of the core 26 into the hole 24 of the body 14 has to be suitably chosen, i.e. the threads have to be replaced, as the device according to FIGS. 3 and 4 relies on a pure linear movement when inserting the core 26c into the inner hole 24. For example different stoppers can be used.

Reference Numbers
10 tool
12 tool cap
14 body
13 guide
16 portion
18 members
22 groove
24 inner hole
26 core
28 surface
30 thread
32 thread
34 holding surface
38 contact surface
40 contact surface
A longitudinal axis

The invention claimed is:

1. A method for cold expansion of a hole formed in a work piece, the method comprising:
providing a body comprising at least a cylindrically shaped part having an inner hole in an axial direction of the body, wherein the body further comprises along a circumferential direction of the body a plurality of members which are movable in a radial direction of the body, such that an outer diameter of the cylindrically shaped part of the body can be changed;
introducing the body into the hole formed in the work piece;
inserting a core into the inner hole of the cylindrically shaped part,
wherein at least one of the core or the inner hole comprises a portion having a changing diameter and the inner hole and the core get into contact with respect to each other upon insertion of the core, such that in dependency of an insertion depth of the core into the inner hole in the axial direction the members move in the radial direction outwardly and the outer diameter of the cylindrically shaped part of the body increases and, accordingly, acts on an inner circumference of the hole formed in the work piece so that a boundary zone of the hole is compressed, which leads to a compression or hardening and, accordingly, to an introduction of compressive stress in the boundary zone,
wherein the inner hole and the core have a polygonal cross section in a direction perpendicular to a longitudinal axis of the core, and
wherein the hole formed in the work piece is expanded over an entire thickness of the work piece in which the hole is formed.

2. The method according to claim 1, further comprising biasing the members of the body into a position with an elastic bias, in which said members assume a minimal diameter.

3. The method according to claim 2, wherein the elastic bias is an elastic cap or a ring member, that encompasses the body from outside.

4. The method according to claim 1, further comprising monitoring the insertion depth of the core into the inner hole.

5. The method according to claim 1, wherein separation lines of the members of the cylindrically shaped part run through a longitudinal axis of the cylindrically shaped part.

6. The method according to claim 5, wherein the cylindrically shaped part is evenly split in a plurality of members, which form in positions of minimal diameter a closed cylinder contour as an outer contour.

7. The method according to claim 1, wherein the cylindrically shaped part is formed by members of different shape, which form in position of maximal diameter a closed cylinder contour as an outer contour.

8. The method according to claim 7, wherein contact surfaces of the members of the cylindrically shaped part are at an angle with respect to the radial direction of the cylindrically shaped part.

9. The method according to claim 1, wherein the polygonal cross-section has a square shape.

10. The method according to claim 1, wherein a number of the members of the body corresponds to a number of sides of the polygonal shape of the inner hole and the core, such that a planar surface of each of the plurality of members of the body corresponds to one surface of the polygonal shape of the inner hole.

11. The method according to claim 1 wherein the work piece is a plate shaped structural part.

12. A method of operating on a work piece, the method comprising expanding a hole in the work piece by a method according to claim 1, and inserting and fixing a mounting device into the hole in the work piece after it has been expanded.

* * * * *